(No Model.) 5 Sheets—Sheet 1.
J. T. WILLIAMS.
ELECTRO MAGNETIC TRANSMITTER.
No. 396,792. Patented Jan. 29, 1889.
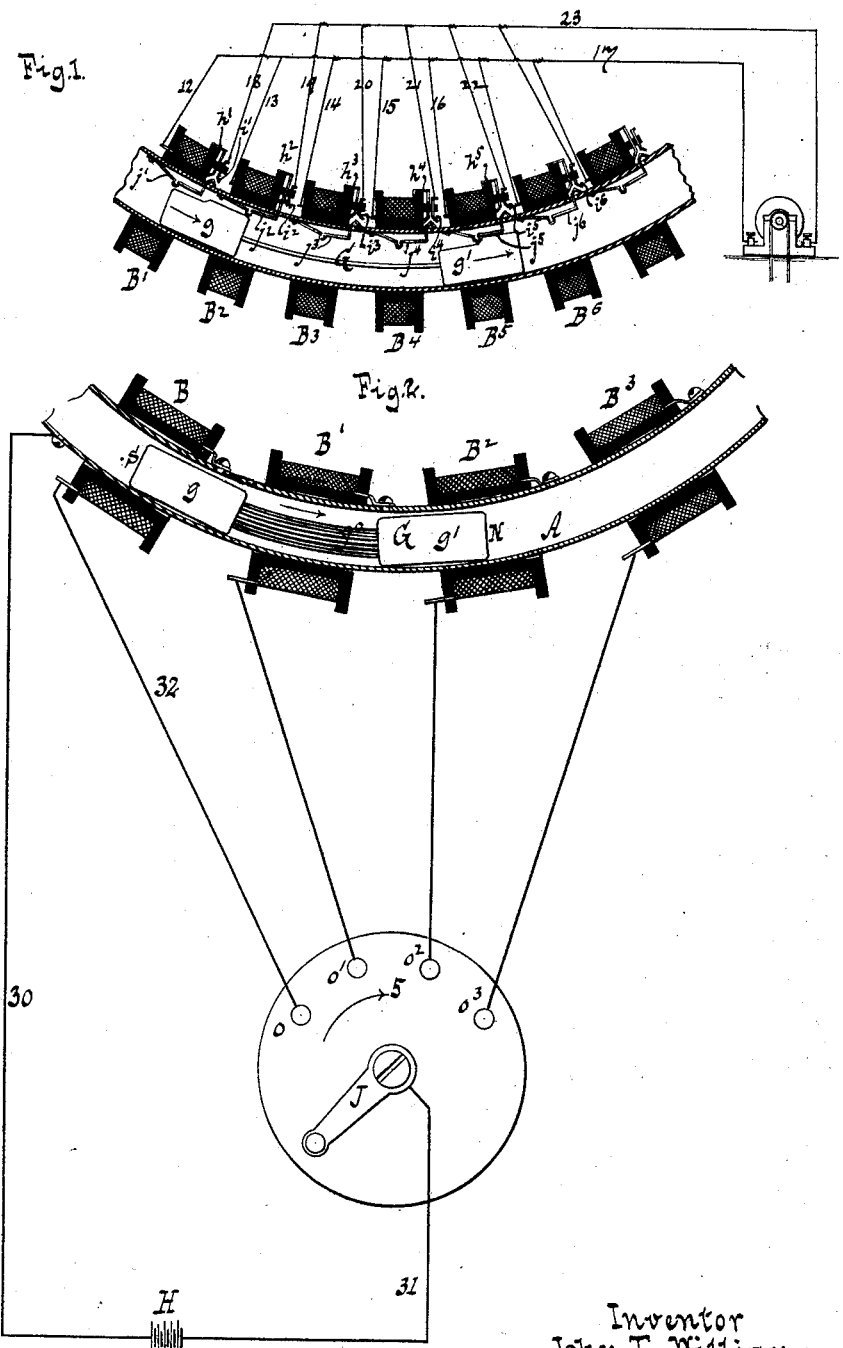
Witnesses.
Inventor
John T. Williams,
by Van Santvoord & Hauff
his att'ys (No Model.) 5 Sheets—Sheet 2.
J. T. WILLIAMS.
ELECTRO MAGNETIC TRANSMITTER.
No. 396,792. Patented Jan. 29, 1889.
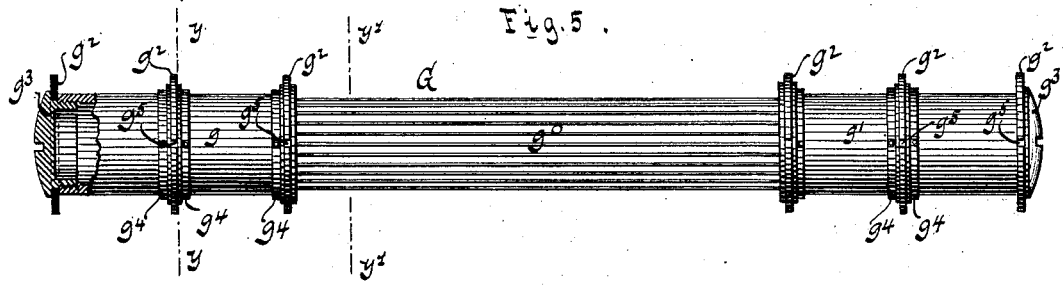
Fig. 5.
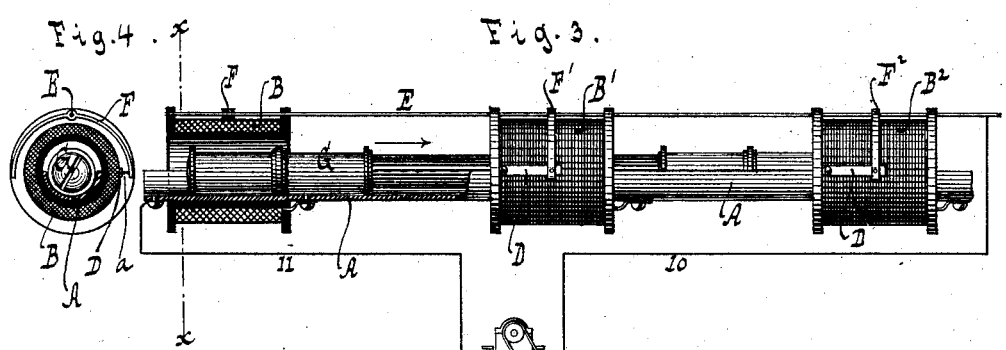
Fig. 4. Fig. 3.
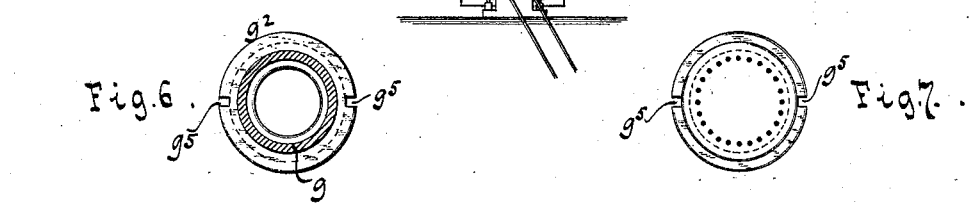
Fig. 6. Fig. 7.
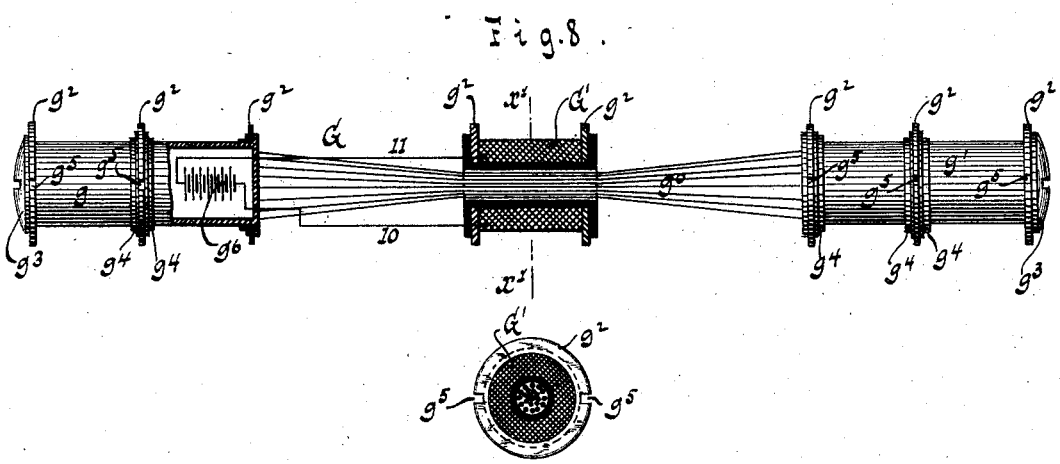
Fig. 8.
Fig. 9.
WITNESSES:
A Faber du Faur Jr.
Otto Hufeland
INVENTOR
John T. Williams
BY Van Santvoord & Hauff
his
ATTORNEYS (No Model.) 5 Sheets—Sheet 3.

J. T. WILLIAMS.
ELECTRO MAGNETIC TRANSMITTER.

No. 396,792. Patented Jan. 29, 1889.

WITNESSES:
A Faber du Faur,
Otto Hufeland.

INVENTOR
John T. Williams
BY
Van Santvoord & Hauff
his ATTORNEYS, (No Model.) 5 Sheets—Sheet 4.

J. T. WILLIAMS.
ELECTRO MAGNETIC TRANSMITTER.

No. 396,792. Patented Jan. 29, 1889.

WITNESSES:

INVENTOR,
John T. Williams
BY Van Santvoord & Hauff
his
ATTORNEYS.

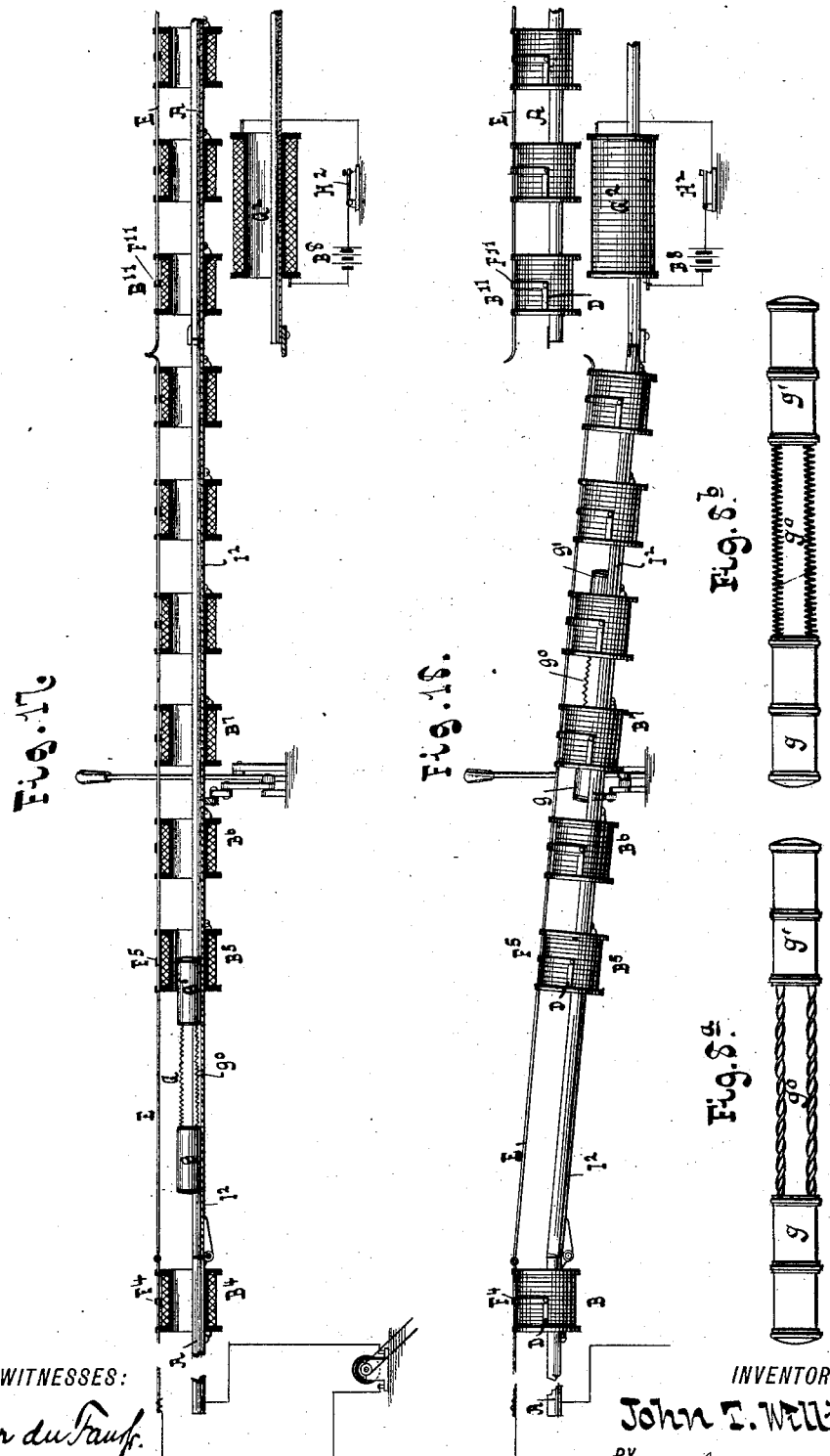

UNITED STATES PATENT OFFICE.

JOHN T. WILLIAMS, OF MOUNT VERNON, NEW YORK.

ELECTRO-MAGNETIC TRANSMITTER.

SPECIFICATION forming part of Letters Patent No. 396,792, dated January 29, 1889.

Application filed May 1, 1886. Serial No. 200,844. (No model.)

*To all whom it may concern:*

Be it known that I, JOHN T. WILLIAMS, a citizen of the United States, residing at Mount Vernon, in the county of Westchester and State of New York, have invented new and useful Improvements in Electro-Magnetic Transmitters, of which the following is a specification.

This invention relates to electro-ports; and it consists in the novel combination of devices hereinafter described and claimed, reference being made to the accompanying drawings, illustrating my invention, in which—

Figure 11:
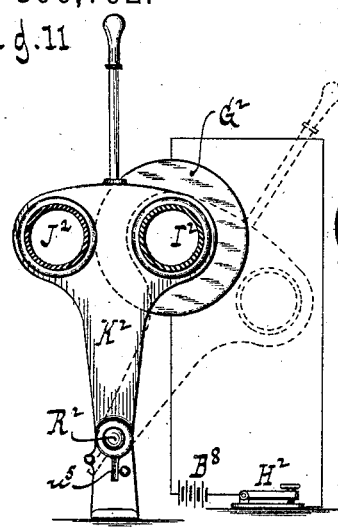
Figure 12:
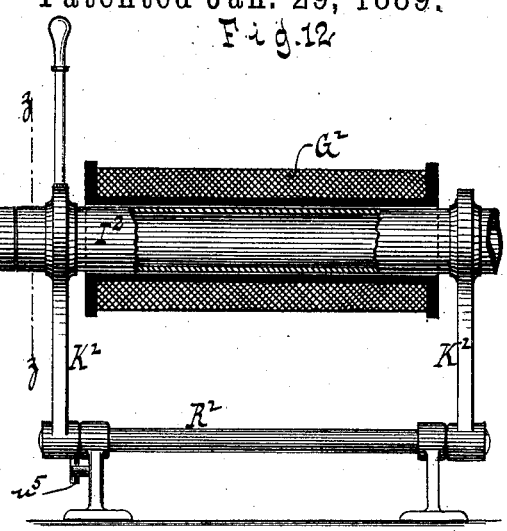
Figure 13:
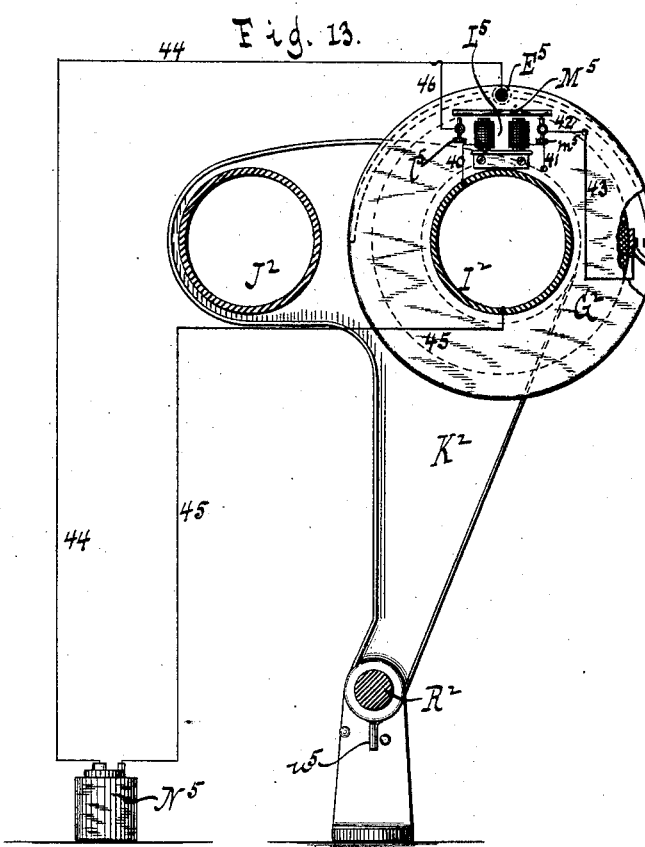
Figure 10:
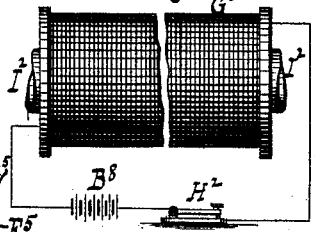
Figure 14:
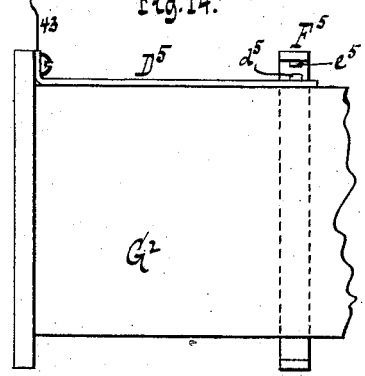
Figure 15:
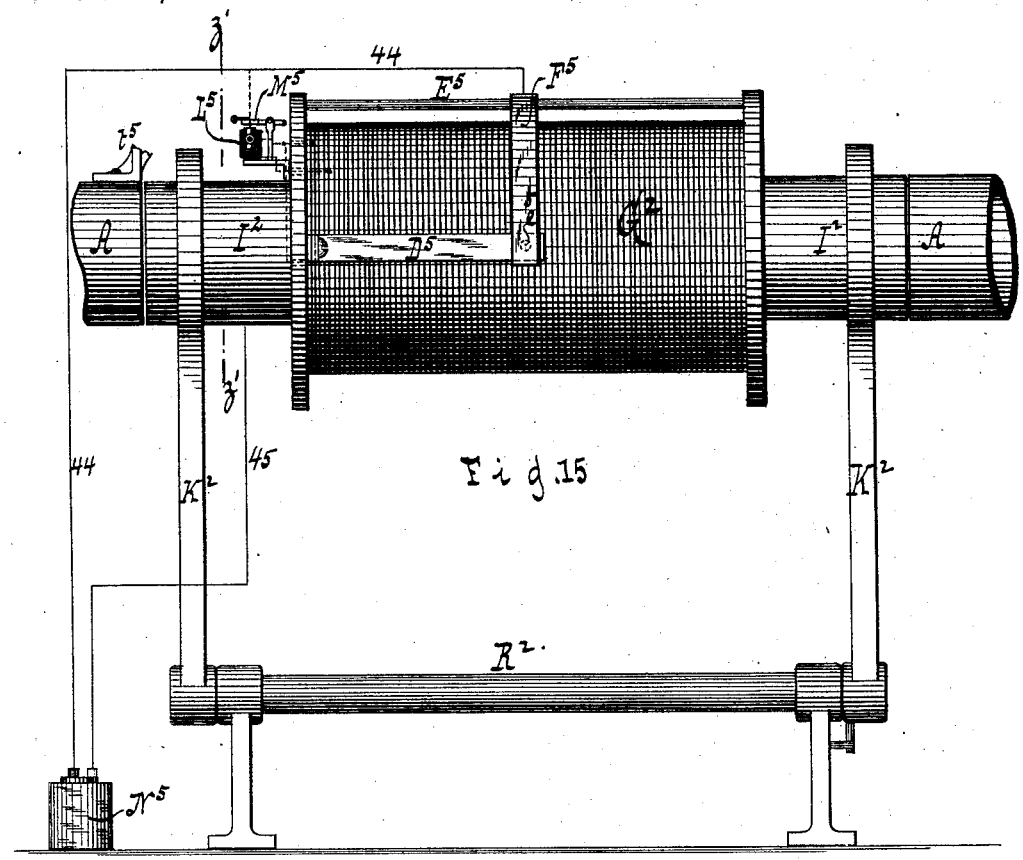
Figure 16:
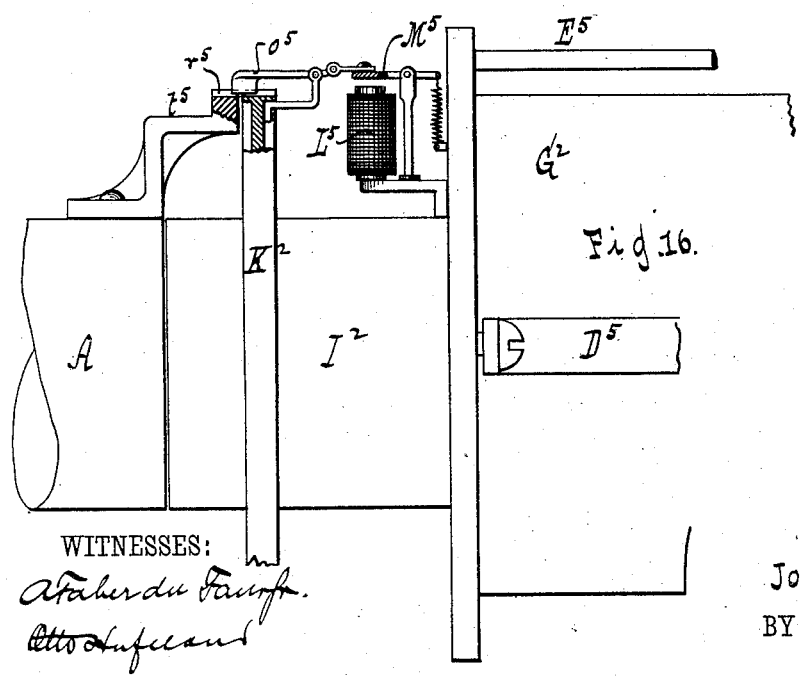

Figure 1 represents a longitudinal central section of a curved section of my electro-port. Fig. 2 is a similar view of a modification thereof. Fig. 3 is a sectional side view of a rectilinear section of my electro-port. Fig. 4 is a transverse section in the plane $x\,x$, Fig. 3. Fig. 5 is a sectional side view of the flexible carriage on a larger scale than the previous figures. Fig. 6 is a transverse section in the plane $y\,y$, Fig. 5. Fig. 7 is a similar section in the plane $y'\,y'$, Fig. 5. Fig. 8 is a sectional side view of a modification of my flexible carriage. Figs. $8^a$ and $8^b$ show other modifications of my flexible carriage. Fig. 9 is a transverse section in the plane $x'\,x'$, Fig. 8. Fig. 10 is a side view of the electro-magnetic brake. Fig. 11 is a transverse section of the brake and switch combined, the line $z\,z$, Fig. 12, indicating the plane of section. Fig. 12 is a sectional side view of the same. Fig. 13 is a transverse section of the switch and brake having an automatic circuit-closer, the line $z'\,z'$, Fig. 15, indicating the plane of section. Fig. 14 is an inverted plan of the helix used in Fig. 13. Fig. 15 is a side view of the switch and brake with an automatic circuit-closer. Fig. 16 is a detached side view of an automatic lock for the switch on a larger scale than the previous figures. Fig. 17 is a sectional view of a switch leading from the main line or track to a side track, which is provided with a brake-helix and a circuit-closer. Fig. 18 is a side view thereof.

Similar letters indicate corresponding parts.

In the drawings, the letter A designates a tube of brass or of any other suitable non-magnetic substance. Upon this tube are mounted at stated intervals, at a greater or less distance from one another, a series of helices, B B′ B², wound upon spools of wood or other non-conductor of electricity.

G is the carriage, which fits the tube A and to which motion is to be imparted. This carriage may be made in the form of a tube, $g$, Fig. 5, on which are firmly secured a series of collars, $g^2$, made of any good non-conductor of heat—such, for instance, as mica—so that the tube $g$ cannot come in direct contact with the inner surface of the tube A. Said non-conducting collars may be clamped against the end of the tube $g$ by means of screw-caps $g^3$, (see Fig. 5,) and they may be secured on the body of said tube $g$, each by means of two rings, $g^4$, as shown, or they may be fastened upon the tube by any means suitable for the purpose. By referring to Figs. 6 and 7 it will be noticed that the non-conducting collars $g^2$ are provided with slots or passages $g^5$, so that the air can freely pass through the same as the carriage moves through the tube A.

The carriage G may be constructed of two tubular heads, $g\,g'$, and an intermediate flexible metallic body, $g^0$, (see Figs. 5, 8, $8^a$, and $8^b$,) and in this case the non-conducting collars are fixed upon said heads in the manner above described. In the example shown in Figs. 5 and 8 the flexible connection $g^0$ consists of a series of thin magnetizable wires, sufficient in quantity to allow the carriage to magnetize as a whole; but said flexible connection may be made of a flat strip of steel or other material, as shown in Fig. 1, or it may be made of a series of coiled strips of sheet metal, as shown in Fig. $8^a$, or of a series of coiled springs, as shown in Fig. $8^b$.

In the example shown in Fig. 8 the carriage G is provided with a helix, G′, which is mounted upon the flexible connection $g^0$ between the tubular heads $g\,g'$. This helix is wound upon a spool of any non-conductor of electricity; but it is provided with non-heat-conducting collars $g^2$ of the nature before described, said collars being made to project beyond the flanges of the spool to prevent them (the flanges) from coming in contact with the tube or guideway along which the carriage moves. The ends 10 and 11 of the helix G′ extend into the head $g$ of the carriage, and they connect to the opposite poles of a battery, $g^6$, (or other source of electricity,) inclosed in said head, whereby the helix is vitalized for the purpose of insuring a good polarity of the carriage. It is obvious that this form of carriage may be united in series and made of any desired length.

The carriage G is made flexible in order to enable it to pass through a curved guide, A, as shown in Figs. 1 and 2. In the example shown in Fig. 1 the flexible carriage closes the circuits through the helices $B'$ $B^2$ $B^3$ $B^4$ $B^5$ successively as it advances through the guide-tube A in the following manner: The helices connect at one end by wires 12 13 14 15 16, respectively, with a wire, 17, which connects with one pole of a dynamo-machine, while the other ends of the helices connect with contact-pieces $h'$ $h^2$ $h^3$ $h^4$ $h^5$ $h^6$. Close to these contact-pieces, but insulated from the same, are contact-pieces $i'$ $i^2$ $i^3$ $i^4$ $i^5$, which connect by wires 18 19 20 21 22 with a wire, 23, leading to the second pole of the dynamo-machine.

In the interior of the guide-tube A are spring-tappets $j'$ $j^2$ $j^3$ $j^4$ $j^5$ $j^6$, one for each helix, and the free ends of these tappets extend through the sides of tube A, and are situated opposite the contact-pieces $h'$ $i'$ $h^2$ $i^2$ $h^3$ $i^3$ $h^4$ $i^4$ $h^5$ $i^5$, respectively.

The carriage G is supposed to move in the direction of the arrow shown on it in the figure. In the position which the carriage occupies a circuit is closed through the helix $B^2$, the circuit through the helix $B^5$ having just been broken, and the carriage is propelled by the axial magnetism of this helix $B^2$. As the carriage advances, the circuit through helix $B^6$ is closed in time to keep up the movement of the carriage, and so on.

In Fig. 2 I have shown an example of my apparatus with circuit-closers controlled entirely independent of the position and the properties of the carriage. B $B'$ $B^2$ $B^3$ are the helices, which are supported upon the tube A. One end of the wire of each helix is in metallic contact with the tube A, while the other end of each wire connects, respectively, with a contact-piece, $o$ $o'$ $o^2$ $o^3$, of an ordinary switch-board. The tube A connects by a wire, 30, with one pole of a battery, H, while the other pole of this battery connects by a wire, 31, with the switch-key J of the switch-board. When the carriage G is properly inserted into the tube A in the direction of the arrow marked near it in Fig. 2 and the switch-key is turned in the direction of arrow 5, the helices B $B'$ $B^2$ $B^3$ are successively introduced into an electric circuit as follows: When the key comes in contact with the first contact-piece, $o$, a current passes through wire 30, tube A, helix B, wire 32, switch-key J, and wire 31. The helix B is vitalized and motion is imparted to the carriage G. When the switch-key touches contact-piece $o'$, the helix $B'$ is vitalized, and so on throughout the entire series, and the carriage is moved forward to the end of tube A. If desired, the switch-key may be so constructed as to cover more than one contact-point at a time, and thus vitalize more than one helix at a time, and instead of connecting one end of the wire of each helix to the metallic tube A said ends may be connected directly to wire 30, and a trough or track may be substituted for the metallic tube. It will be noticed that in both examples, Figs. 1 and 2, the track is curved, while the carriage is flexible and made of soft iron.

The arrangement of the helices apart from each other, as described and shown, enables me to construct the tube, trough, or track in curved forms, and also allows the air which is pushed before the moving core or carriage to freely escape through the spaces between the helices, thus enabling the carriage to move freely on its track without material resistance from the air, as will be clear by observing Fig. 3, where an open trough or track is shown extending through the successive separated helices. In the case of the tube shown in Fig. 1 the air, as the core or carriage proceeds, escapes from the tube through the holes in its side, through which the circuit-closing tappets $j$ $j'$ $j^2$, and so forth, pass.

In the example shown in Figs. 3 and 4 the flexible carriage G is made in the form of a magnet, and in this case the tube or track A is made of brass, having one end of the wire from each helix B $B'$ $B^2$ brazed or soldered or otherwise metallically connected thereto, while the other end of each helix is connected, respectively, to a contact-piece, D, which has a contact-point, $a$, of platinum attached thereto. (See Fig. 4.) Through the flanges of the spools containing the helices extends an electric conductor, E, which is insulated from the track A and from the helices, and on this conductor are mounted a series of magnets, F $F'$ $F^2$, which in the example shown are made in the form of horseshoes, and which embrace the helices B $B'$ $B^2$, respectively. These magnets are so constructed that they can swing a limited distance upon the conductor in a plane at right angles to the track A. As the magnetic carriage G advances on the track through the helices, the magnetic circuit-closers are successively attracted and circuits are closed through the corresponding helices. For this purpose the conductor E connects by a wire, 10, with one pole of a dynamo-machine, and the track A connects by a wire, 11, with the other pole of said dynamo-machine. If the magnet $F^2$ is brought in contact with its contact-point $a$, a circuit is closed through wire 11, track A, helix $B^2$, contact-piece D, magnet $F^2$, conductor E, and wire 10, back to the dynamo-machine. Of course any suitable source of electricity can be substituted for the dynamo-machine.

In order to be able to stop the carriage at any desired point in the tube or on the track A, I mount upon said track a helix, $G^2$, Fig. 10, made of such dimensions as to adapt it to the size and requirements of the carriage, and which, when vitalized by a current of electricity of sufficient strength, will stop the carriage within said helix. This helix is vitalized by a battery, $B^8$, Fig. 10, the battery-circuit through the helix being controlled by a key, $H^2$. This key may be operated by a person or controlled by some mechanical or other means to keep the circuit closed sufficiently long to assure the stoppage of the carriage.

With the brake-helix $G^2$, I have combined a switch mechanism, as illustrated in Figs. 11 and 12. By referring to these figures it will be seen that the brake-helix $G^2$ is mounted upon a tube, $I^2$, which is supported in a frame, $K^2$. This frame carries a second tube, $J^2$, of the same dimension as the tube $I^2$, and it is mounted upon a rock-shaft, $R^2$, in such relation to the tube or track $A$ that either of the tubes $I^2$ or $J^2$ can be brought in such a position that it forms a section of the same. When it is desired to stop the carriage, the frame $K^2$ is placed so as to adjust the tube $I^2$ in the main line. The operator by depressing the key $H^2$ vitalizes the brake-helix $G^2$, and when the carriage enters this helix it is caused to stop. The frame $K^2$ can be shifted and the tube $I^2$ thrown out of and the tube $J^2$ thrown into the main line, thus allowing other carriages to pass, while the one brought to a stop can be emptied or filled. It is not necessary that the arrangement to introduce the tubes $I^2$ $J^2$ into the main line be in the exact form here described, as the carriage might be switched off from the main line and stopped afterward by a helix and circuit-closer, as shown in Figs. 17 and 18. Instead of closing the circuit through the brake-helix $G^2$ by a hand-key, as above described, said circuit may be closed automatically by means substantially such as shown in Figs. 13, 14, and 15. For this purpose I attach to the brake-helix $G^2$ an electric conductor, $E^5$, which may be supported in the flanges of the helix, or which may be mounted in any other suitable manner, but which must be insulated from the wire forming the helix. On this conductor is hung a permanent magnet, $F^5$, which is by preference made in the form of a horseshoe embracing the helix, as indicated in dotted lines in Fig. 13, and which can swing a limited distance on the conductor $E^5$. On one branch of this horseshoe-magnet is secured a contact-point, $e^5$, Fig. 14, and on the flange of the helix $G^2$ is secured a metallic arm, $D^5$, provided with contact-point $d^5$.

$L^5$ is an electro-magnet supported by a bracket which is secured to the spool of the brake-helix $G^2$. $M^5$ is the armature of this electro-magnet, and $l^5$ $m^5$ are two stops or contact-points, one on each side of the electro-magnet $L^5$. One end of the wire of the electro-magnet $L^5$ connects by a wire, 40, with the metallic tube $I^2$, which supports the brake-helix $G^2$. The other end of said wire connects by a wire, 41, with the inner end of the brake-helix $G^2$. The stop $m^5$ connects by a wire, 42, with the outer end of the brake-helix $G^2$, and this outer end also connects by a wire, 43, with the arm $D^5$. The conductor $E^5$ connects by a wire, 44, with one pole of a battery, $N^5$, and the other pole of this battery connects by a wire, 45, with the tube $I^2$. The stop $l^5$ connects by a wire, 46, with the wire 44. When the magnetic carriage $G$ enters the brake-helix $G^2$, the magnet $F^5$ is attracted to close the contact at $e^5$ $d^5$. This causes a current to pass through wire 45, tube $I^2$, wire 40, electro-magnet $L^5$, wire 41, brake-helix $G^2$, wire 43, arm $D^5$, magnet $F^5$, conductor $E^5$, and wire 44, back to the battery $N^5$; and since by closing this circuit the electro-magnet $L^5$ is vitalized, as well as the brake-helix $G^2$, the armature $M^5$ is brought into contact with the stops $l^5$ $m^5$, and a new circuit is closed through wire 45, tube $I^2$, wire 40, electro-magnet $L^5$, wire 41, helix $G^2$, wire 42, stop $m^5$, armature $M^5$, stop $l^5$, and wires 46 and 44, back to the battery, and the circuit through the brake-helix $G^2$ will be thus maintained for any desired length of time after the contact $e^5$ $d^5$ of the magnet $F^5$ has been broken.

With the switch-frame $K^2$ is combined a latch, $o^5$, (see Figs. 15 and 16,) which is attached to the armature $M^5$ of the electro-magnet $L^5$ in such a manner that when the said armature is up the latch catches in a recess, $r^5$, in a bracket, $t^5$, secured to the tube or track $A$; but when the electro-magnet $L^5$ is vitalized and its armature is attracted the latch $o^5$ is raised and the switch-frame $K^2$ is permitted to follow its inherent gravity to move from the position shown in full lines in Fig. 11 to that shown in dotted lines, thereby carrying the tube $J^2$ in line with the track $A$. A suitable stop, $u^5$, prevents the switch-frame from moving beyond the desired limits in either direction.

The object of closing the circuit through the brake-helix $G^2$ may also be accomplished by using the armature $M^5$ as the circuit-closer in place of the horseshoe-magnet $F^5$. If the magnetic carriage enters the section $I^2$, the armature $M^5$ of the electro-magnet $L^5$ is attracted by the magnetic action of the carriage itself, and the circuit through the brake-helix $G^2$ is closed as follows: battery $N^5$, wire 45, tube $I^2$, wire 40, helix of the electro-magnet $L^5$, wire 41, helix $G^2$, wire 42, stop $m^5$, armature $M^5$, stop $l^5$, and wires 46 and 44, back to the battery, provided the armature of the electro-magnet $L^5$ is adjusted to respond to the attractive force of the carriage.

What I claim as new, and desire to secure by Letters Patent, is—

1. The combination, with a series of helices placed at suitable distances apart, and with a tube, trough, or track extending through said helices, of a flexible core or carriage which can freely pass through said helices, a series of independent circuit-closers, one for each helix, consisting of spring-tappets adapted to be actuated by the core or carriage, and contact-pieces and the connections of the helices with a dynamo-machine or other source of electricity, substantially as described.

2. The combination, with a series of helices placed at suitable distances apart, and with a tube, trough, or track extending through said helices, of a flexible core or carriage consisting of two heads and an intermediate flexible magnetizable material which can freely pass through said helices, a series of circuit-closers, one for each helix, detached from said carriage, and their connections with a dynamo-machine or other source of electricity, said circuit-closers being actuated by the passing carriage, and serving to close and break said circuits through the successive helices in the series, substantially as described.

3. The combination, with a series of helices placed at suitable distances apart, and with a suitable tube, trough, or track extending through said helices, of a core or carriage which can freely pass through said helices, two or more anti-heating collars secured to said carriage, a series of circuit-closers, one for each helix, and the connections of said helices with a dynamo-machine or other source of electricity, substantially as described.

4. The combination, with a series of helices placed at suitable distances apart, and with a tube, trough, or track extending through said helices, of a flexible core or carriage which can freely pass through said helices, two or more anti-heating collars secured to said carriage, a series of circuit-closers, one for each helix, and their connections with a dynamo-machine or other source of electricity, substantially as described.

5. The combination of a tube, trough, or track, helices placed at suitable distances apart thereupon, a circuit-closer for each helix, connections between the helices and a dynamo or other source of electricity, a traveling carriage which actuates the circuit-closers, and an electro-magnetic brake for stopping the carriage, substantially as described.

6. The combination, with a tube, trough, or track, of a magnetizable carriage, an electro-magnetic brake mounted on the tube, trough, or track, a battery or other source of electricity having a circuit through the brake, and a circuit-closer connected with the brake for closing the circuit through the latter to stop the carriage, substantially as described.

7. The combination, with a tube, trough, or track, of a magnetizable traveling carriage and an electro-magnetic brake mounted on the tube, trough, or track, and disconnected from the carriage for stopping the latter, substantially as described.

8. The combination, with a tube, trough, or track, of a magnetizable traveling carriage, a tubular brake-helix, through which the tube, trough, or track passes, a battery or other source of electricity having a circuit through the brake-helix, and a circuit-closer connected with the brake-helix for closing the circuit therethrough to stop the carriage, substantially as described.

9. The combination of a tube, trough, or track, a series of helices at suitable distances apart, a series of circuit-closers, one for each helix, connections between the helices and a dynamo-machine or other source of electricity, a traveling carriage which operates the circuit-closers, and a laterally-movable carriage-supporting switch for diverting the carriage out of line with the main portion of the tube, trough, or track, substantially as described.

10. The combination of a tube, trough, or track, a series of helices at suitable distances apart, a series of circuit-closers, one for each helix, connections between the helices and a dynamo-machine or other source of electricity, a traveling carriage which operates the circuit-closers, an electro-magnetic brake for stopping the carriage, and a laterally-movable carriage-supporting switch for diverting the carriage out of line with the main portion of the tube, trough, or track, substantially as described.

11. The combination of a tube, trough, or track, a series of helices at suitable distances, a series of circuit-closers, one for each helix, connections between the helices and a dynamo-machine or other source of electricity, a traveling carriage movable through the helices and which operates the circuit-closers, and a carriage-supporting switch consisting of a movable section of the tube, trough, or track, for moving the carriage out of line with the main portion of the tube, trough, or track, substantially as described.

12. The combination, with a tube, trough, or track and carriage-impelling helices thereupon at suitable intervals, of a carriage consisting of two heads and a flexible magnetizable connection between the heads, substantially as described.

13. The combination of a tube or track, electro-magnets, a traveling carriage impelled by the electro-magnets, an electro-magnetic brake mounted on the tube or track to stop the carriage, and a carriage-supporting switch-section movable into and out of line with the main portion of the tube or track, substantially as described.

14. The combination, with a carriage, G, composed of two heads and a magnetizable flexible connection between the heads, of a helix, G, mounted on said flexible connection, a battery, $g^6$, located in one of the carriage-heads, and connections between the battery and helix, substantially as described.

15. The combination, with a tube, trough, or track, and with a magnetizable core or carriage adapted to move therein or thereon, of a brake-helix, a circuit-closer connected to the brake-helix and actuated by the moving carriage, a secondary electro-magnet for holding the circuit through the brake-helix closed, and the connections of the brake-helix and the secondary electro-magnet with a battery or other source of electricity, substantially as described.

16. The combination, with a tube, trough, or track, and with a magnetizable core or carriage adapted to move therein or thereon, of the switch-frame $K^2$, the latch for locking the switch-frame, and the electro-magnet $L^5$, for opening the latch, substantially as described.

17. The combination, with the carriage G, of anti-heating collars $g^2$, substantially as described.

18. The combination, with the carriage G, of anti-heating collars $g^2$ and slots $g^5$ in the said collars, substantially as described.

19. The combination, with the brake-helix $G^2$, of the electro-magnet $L^5$ and the armature $M^5$, to maintain a circuit in the brake-helix $G^2$ until the connection is otherwise broken, substantially as described.

20. The frame $K^2$, mounted on the rock-shaft $R^2$ and carrying the sections $J^2$ $I^2$ of the main tube or track, in combination with a brake-helix and a circuit-closer, substantially as and for the purpose described.

In testimony whereof I have hereunto set my hand and seal in the presence of two subscribing witnesses.

JOHN T. WILLIAMS. [L. S.]

Witnesses:
W. HAUFF,
E. F. KASTENHUBER.